UNITED STATES PATENT OFFICE.

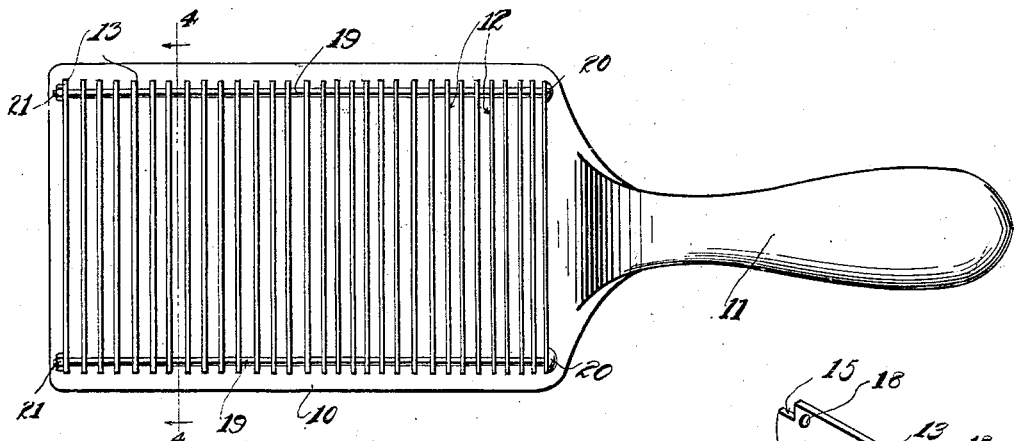
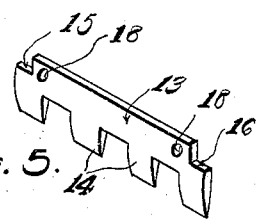
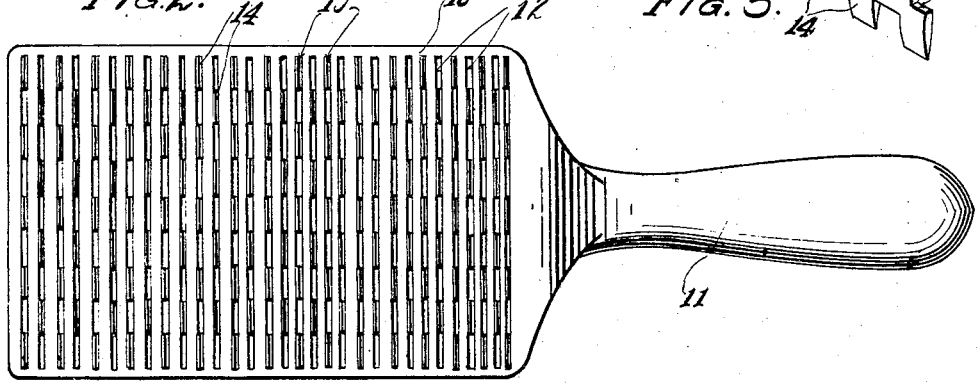
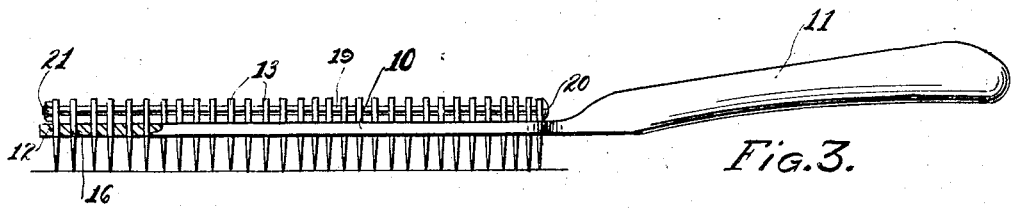
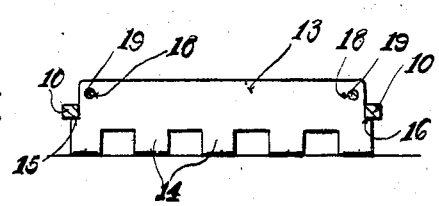

SUSAN S. PHELPS, OF HOMINY, OKLAHOMA.

MEAT-TENDERER.

1,067,673.  Specification of Letters Patent.  Patented July 15, 1913.

Application filed January 5, 1911. Serial No. 600,930.

*To all whom it may concern:*

Be it known that I, SUSAN S. PHELPS, a citizen of the United States, residing at Hominy, in the county of Osage, State of Oklahoma, have invented certain new and useful Improvements in Meat-Tenderers; and I do hereby declare the following to be a full, clear, and exact description of the invention, such as will enable others skilled in the art to which it appertains to make and use the same.

This invention relates to meat tenderers, and has for one of its objects to provide a simply constructed device of this character of improved construction and increased efficiency and utility.

Another object of the invention is to provide a device of this character so constructed that the parts may be readily disconnected for cleansing or to renew broken or impaired parts.

With these and other objects in view, the invention consists in certain novel features of construction as hereinafter shown and described and then specifically pointed out in the claim; and, in the drawings illustrative of the preferred embodiment of the invention, Figure 1 is a top plan view of the improved device, Fig. 2 is a bottom plan view of the same, Fig. 3 is a side elevation, partly in section, of the improved device, Fig. 4 is a transverse section on the line 4—4 of Fig. 1, Fig. 5 is a perspective view of one of the cutting blades disconnected.

The improved device comprises a body or base plate 10 having a handle 11 extending from one side, the plate and its handle being preferably formed in one piece of sheet metal, preferably steel. The body of the plate 10 is provided with a plurality of transversely arranged slots 12 spaced apart, as shown. Fitting through each of the slots is a blade 13, each blade having a plurality of cutting members 14 extending from its lower edge and with notches 15—16 in its ends. The portion of each blade 13 which is located between the notches 15—16 extends from below through one of the slots 12 with the shoulders formed by the notches 15—16 bearing against the under-face of the plate. Each of the blades 13 is provided with two or more apertures 18 near the ends, and tie bolts 19 are extended through the apertures, as shown, each of the tie bolts having a head 20 at one end and a binding nut 21 at the other end. By this means the blades 13 are firmly secured in position and locked to the base 10. The blades 13 will be arranged in two series, each blade of one series having a cutting member 14 less than the other series, so that when the two sets of blades are arranged alternately, the cutting members 14 will likewise be arranged alternately as shown in Fig. 2, or the cutting members of each alternate blade disposed opposite the spaces between the cutting members of the remaining blades. By this means the cutting surface is "broken," as shown in Fig. 2. By this arrangement it will be obvious that a simply constructed meat tenderer is produced in which the parts are rigidly coupled, while at the same time the blades are readily separable when the device requires cleansing, or when one of the blades is broken or impaired. Thus a broken or impaired blade may be readily replaced without discarding the body 10 or other parts. By this means the "life" of the improved implement is extended indefinitely, as one body 10 and its handle 11 will outwear a number of sets of blades 13, as will be obvious. By this arrangement also blades having different widths of cutting members may be employed. The body 10 may be of any required size, and by means of which beef steak and similar products may be macerated to sever the tough portions and render otherwise tough beef steak palatable. It will be noted that the head and nut of each of the bolts 19 bear forcibly upon the body 10 and serve to force the body snugly into the notches of the blade and thus positively prevent annoying rattling of the blades.

What is claimed is:—

A meat tenderer comprising a back plate having a handle, said plate being provided with a transverse slot terminating short of the side edges of the plate, a blade in said slot projecting above and below said back plate and having the upper corners formed with notches, the bottom walls of said notches bearing against the bottom face of said back plate beyond the ends of said slot and the side walls of said notches bearing against the end walls of said slot, and a securing pin passed transversely through said blade and bearing against the top face of said back plate.

In testimony whereof, I affix my signature, in presence of two witnesses.

SUSAN S. PHELPS.

Witnesses:
M. C. GROVE,
JAMES WILSON.

Copies of this patent may be obtained for five cents each, by addressing the "Commissioner of Patents, Washington, D. C."